Patented Sept. 22, 1931

1,824,448

UNITED STATES PATENT OFFICE

TEIKICHI SATOW, OF TOKYO, JAPAN

WATERPROOF GLUE

No Drawing.    Application filed January 23, 1926.   Serial No. 83,200.

This invention relates to a water-proof glue and paint composition, wherein a protein supplying agent constitutes an important ingredient, and which is rendered more effective by a protein digestive enzyme containing material. The herein described glue composition is adapted to be readily converted into a water paint.

The object of my invention accordingly includes the preparation of a water-proof glue composition in a powdered form which will not deteriorate under normal conditions, and which becomes active and quickly available with the addition of water.

It has heretofore been proposed to use the residue obtained from de-oiled soy-beans or from soy-bean cake, as an ingredient in glue, on account of the adhesive qualities of the soy-bean protein when glutenized. I have discovered that the adhesive qualities of the soy-bean product is greatly enhanced and is rendered more effective by the action of an enzyme having protein digestive powers. I have also found that my improved glue composition is rendered practically impervious to water by the addition of an oxidizing agent, and that if I supply a pigment for color with the filler or base, I have a water-soluble paint which is ready for use by the addition of water and stirring.

I have found that raw soy-bean flour obtained from soy-beans which have been de-oiled by the solvent process set forth and claimed in my copending application, Serial No. 83,198, of even date herewith for method of preparing soy bean meal and food products obtained therefrom, gives most excellent results. As a specific example, to which I do not wish however to be limited except as defined by the attached claims, I take 100 parts by weight of the raw de-oiled soy-bean flour, and mix with this a protein digestive enzyme containing material 3 to 8 parts. To this may be added 10 parts of a fluorid as sodium fluorid for the liquefying agent, 20 to 25 parts of an hydroxid as calcium hydroxid for the fixing agent, a suitable filler, as calcium carbonate or barium sulfate, alone or an intermixture thereof, up to 50 to 70 parts, and an oxidizing or water-proofing agent, as potassium chromate or lead chromate up to 10 parts. The ingredients are thoroughly mixed together, preferably in the powdered form and are ready for use by the addition of water. The liquefying agent now serves to keep the compound from drying out.

In some cases the oxidizing agent may be omitted and the above glue composition may be made up into a water-soluble paint. For this purpose I increase the filler to about 70 parts and use as the selected pigment any coloring matter to produce the desired color. The ingredients are thoroughly mixed as before and by the addition of water, I form glue or paint which is ready for immediate use.

The specific enzyme containing protein digestive material which I find very effective, is added in the form of a powder, which is obtained by evaporating the papaia extract or milk in any suitable manner known to the art, as on heated rotating drums, for example. I do not desire, however, to confine myself to this specific source, as any like substance containing strongly protein digestive enzyme containing agents, such as pepsin, trypsin, or the like, will accomplish the desired results.

Having now described my invention, what I claim as new and useful, of my own invention, and desire to secure by Letters Patent, is:

1. An adhesive composition comprising a protein containing material having mixed therewith papaia milk, a filler material, calcium hydroxid and a potassium chromate.

2. An adhesive composition comprising a protein containing material having mixed therewith papaia milk, a filler material, calcium hydroxid, a chromate and a pigment.

3. A powdered composition comprising a protein containing material and powdered papaia milk.

4. A composition for glue comprising a protein containing material and powdered papaia milk with which potassium chromate is mixed.

5. An adhesive composition comprising a protein containing material and powdered papaia milk mixed with a chromate and a pigment.

6. An adhesive composition suitable for a coating material containing de-oiled soy-bean flour mixed with papaia milk.

7. A glue forming powder comprising de-oiled soy-bean flour mixed with papaia milk, in proportion of 100 parts by weight of the flour and 3 to 8 parts by weight of the milk in powdered form.

8. An adhesive composition containing de-oiled soy-bean flour mixed with powdered papaia milk, in proportion of 100 parts by weight of the flour and 3 to 8 parts by weight of the milk and having potassium chromate and a filler incorporated therewith.

9. An adhesive composition in powdered form comprising de-oiled soy-bean flour mixed with powdered papaia milk, in proportion of 100 parts by weight of the flour and 3 to 8 parts by weight of the milk and having mixed therewith a chromate, a sodium fluorid, calcium hydroxid and a filler.

10. An adhesive coating composition comprising de-oiled soy-bean flour mixed with powdered papaia milk, in proportion of 100 parts by weight of the flour and 3 to 8 parts by weight of the milk and having mixed therewith potassium chromate, calcium hydroxid, a pigment and a filler.

11. A composition for glue comprising de-oiled soy-bean meal intimately mixed with pepsinic enzyme, sodium fluorid and potassium chromate.

12. A powdered composition comprising de-oiled soy-bean meal mixed with pepsinic enzymic material, sodium fluorid, calcium hydroxid, calcium carbonate and potassium chromate.

13. The process of manufacturing glue material from soy-bean meal which comprises mixing de-oiled soy-bean meal with powdered papaia milk, sodium fluorid and calcium hydroxid.

14. The process of manufacturing a glue composition from de-oiled soy-bean meal which consists in pulverizing together one hundred parts of soy-bean meal with three to eight parts of pepsinic enzyme containing material, sodium fluorid, calcium hydroxid, potassium chromate, and water sufficient to make a pasty fluid.

15. A composition for glue comprising soy-bean meal intimately mixed with a pepsinic enzymic material.

16. A composition for glue comprising soy-bean meal mixed with a pepsinic enzymic material, sodium fluorid, calcium hydroxid, calcium carbonate and potassium chromate.

17. A powdered composition comprising a protein containing ingredient and a pepsinic enzyme, sodium fluorid and potassium chromate.

In testimony whereof I have hereunto set my hand on this 7th day of January A. D., 1926.

TEIKICHI SATOW.